United States Patent [19]

Hughes

[11] Patent Number: 4,770,833

[45] Date of Patent: Sep. 13, 1988

[54] METHOD OF ENCLOSING AN OBJECT

[75] Inventor: John T. Hughes, Cromwell Crescent, United Kingdom

[73] Assignee: Micropore International Limited, Droitwich, United Kingdom

[21] Appl. No.: 41,434

[22] Filed: Apr. 15, 1987

[30] Foreign Application Priority Data

Apr. 16, 1986 [GB] United Kingdom ............... 8609324

[51] Int. Cl.⁴ .............................................. B29C 43/18
[52] U.S. Cl. ..................................... 264/120; 264/255; 264/272.11; 264/272.15; 338/226; 338/238
[58] Field of Search ................ 264/120, 135, 272.11, 264/249, 272.18; 425/422; 264/255, 256, 272.15, 272.16; 338/226, 232, 238, 243

[56] References Cited

U.S. PATENT DOCUMENTS

| | | | |
|---|---|---|---|
| 807,437 | 12/1905 | Burt | 264/120 |
| 973,280 | 10/1910 | Knight | 264/120 |
| 2,267,954 | 12/1941 | Schumacher | 264/249 |
| 2,284,439 | 5/1942 | MacArthur et al. | 264/135 |
| 2,444,880 | 7/1948 | Robinson | 264/272.18 |
| 3,221,089 | 11/1965 | Cotton | 264/272.18 |
| 3,975,127 | 8/1976 | Munk et al. | 425/422 |

*Primary Examiner*—Jay H. Woo
*Assistant Examiner*—C. Scott Bushey
*Attorney, Agent, or Firm*—Browdy and Neimark

[57] ABSTRACT

A method of enclosing an object, such as an electronic component, within a homogeneous block of microporous thermal insulation material comprises charging a first predetermined amount of a loose microporous thermal insulation mixture into a die and compacting the insulation mixture into a block for supporting the object to be insulated. A recess may be formed in the compacted mixture for receiving the object. The object is then located on the compacted mixture and a second predetermined amount of loose microporous thermal insulation mixture is charged into the die. The loose insulation mixture is compacted against the block of already compacted insulation material which causes the two charges of insulation mixture to merge and to form a homogeneous block enclosing the object.

7 Claims, 1 Drawing Sheet

METHOD OF ENCLOSING AN OBJECT

FIELD OF THE INVENTION

The present invention relates to a method of enclosing an object within a homogeneous block of microporous thermal insulation material.

DESCRIPTION OF PRIOR ART

When an object to be thermally insulated requires a particularly high performance from the insulation material, care must be taken to ensure that the individual components of the surrounding insulating body are a particularly good fit with each other in order to eliminate as far as possible the passage of heat through the gap which inevitably exists between the individual components of the insulating body.

A good fit between the individual components is especially important when the insulation material is a microporous thermal insulation because even still air has a higher thermal conductivity than the insulation material so that even a small gap will act as a path for heat conduction as well as for infra-red radiation. Ideally all gaps and joints should be eliminated so that the object to be thermally insulated is totally enclosed within the insulation material. This can readily be achieved when the insulation material is a mouldable foam material or when it can otherwise be assumed that the object to be insulated will remain undisturbed within the insulation material.

Microporous thermal insulation is normally manufactured as a block material by first mixing together the constituents of the insulation material, for example a finely divided insulating powder, an infra-red opacifier and/or a reinforcing fibre, so as to form an intimate mixture. The intimate mixture itself typically has a density of 25 to 100 kgm$^{-3}$ and the manufactured block typically has a density of 200 to 400 kgm$^{-3}$. In practice, during compaction the volume of the mixture is reduced typically to about ten percent of its original volume.

Heretofore it has been considered impractical to locate an object to be insulated within a homogeneous block of microporous thermal insulation material. This is because the intimate mixture is too fluid to support an object at a predetermined position so that it is not possible, for example, to locate an object at a central point within the intimate mixture and subsequently to apply pressure so as to form the block around the object. It may be possible to provide an external support for the object so as to determine the initial position of the object, but we have found that the final position of the object within the block is still likely to be at a random position. We have found that the handling characteristics of the intimate mixture can vary depending on the storage of the intimate mixture. If the intimate mixture is allowed to stand for only a few minutes it has a relatively low density, but if it is allowed to stand for several hours it has a relatively high density because air is slowly release from the mixture and settling takes place. Irrespective of whether the intimate mixture is allowed to stand for a short or a long time, the mixture is capable of being compacted to produce a satisfactory block of microporous thermal insulation material, but any means used to locate an object to be insulated within the intimate mixutre so that the block can be formed around the object must be capable of adapting to different characteristics of the mixture if a large number of objects is required to be insulated in a substantially identical manner. Any such means of locating the object to be insulated within the intimate mixture will inevitably be complicated and eventually may lead to a short heat path through the insulation material.

The insulation of small electrical components, for example, has until now been achieved by manufacturing two or more pieces of the insulation material which are designed to fit as closely as possible around the electrical component. A housing is normally provided for the insulation material to give protection during handling of the insulated electrical component. Such an assembly can provide satisfactory thermal performance, but it is expensive to manufacture and some gaps and joints will be present in the insulation material.

OBJECT OF THE INVENTION

It is an object of the present invention to provide a method of enclosing an object such as an electrical component within a homogeneous block of microporous thermal insulation material so as to provide particularly low thermal conductivity in a cost effective manner.

SUMMARY OF THE INVENTION

According to the present invention there is provided a method of enclosing an object within a homogeneous block of microporous thermal insulation material, which method comprises the steps of:

charging a first predetermined amount of loose microporous thermal insulation mixture into a die;

compacting the insulation mixture into a block for supporting an object to be insulated;

locating the object on the block;

charging a second predetermined amount of loose microporous thermal insulation mixture into the die; and compacting the loose insulation mixture against the block of compacted insulation material so as to form a homogeneous block enclosing the object.

The first predetermined amount of loose microporous thermal insulation mixture may be compacted into a block having a recess for receiving the object to be insulated.

The first predetermined amount of insulation mixture may be compacted to a density which is lower than the density of the homogeneous block, for example the density may be about 10 percent less than the density of the homogeneous block.

The homogeneous block may be removed from the die, or the homogeneous block may be retained within the die in order to provide mechanical protection for. The die may be provided with a cover so as to enclose the homogeneous block.

For a better understanding of the present invention and to show more clearly how it may be carried into effect reference will now be made, by way of example, to the accompanying drawings in which:

DESCRIPTION OF PREFERRED EMBODIMENT

Figure 1:
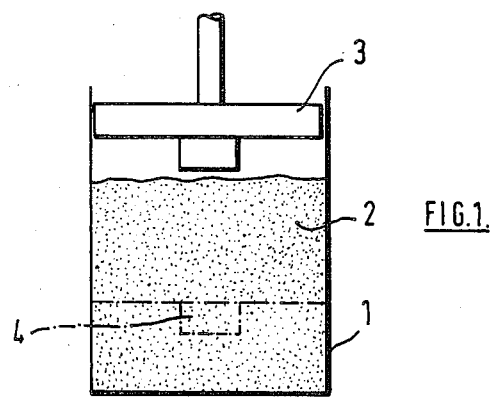
FIG. 1 illustrates a first stage of the method according to the present invention.

The first stage in the process of enclosing an object within a homogeneous block of microporous thermal insulation is illustrated in FIG. 1 which shows a lower die 1 which is charged with a predetermined amount of a loose microporous thermal insulation mixture 2. An upper die 3 is provided for compacting the mixture 2 in a manner such that a recess 4 is formed in the compacted mixture. It is known to the skilled person that after compaction the insulation material possesses a resilience which causes the material to expand when the lower and upper dies 1, 3 are separated so allowance is made for the expansion when designing the dies 1, 3. The insulation mixture 2 is compacted to a density which may be lower than the density required for the final homogeneous block.

Figure 2:
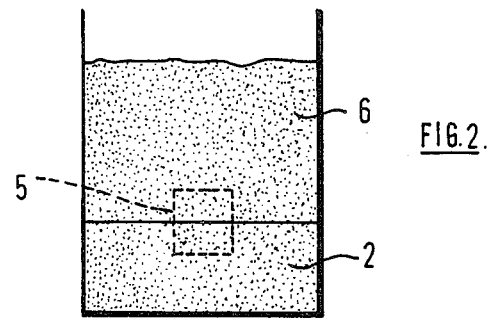
FIG. 2 illustrates a second stage of the method according to the present invention.

An object 5, such as an electronic component, is then, located in the recess 4 and a further charge of insulation mixture 6 is added to the lower die as shown in FIG. 2. The second stage of the process is to compact the mixture 6 and to consolidate the insulation mixture around the object 5.

When pressure is applied to compact the insulation mixture 6 it will result in further compaction of the insulation mixture 2 because of the resilience of the compacted insulation material. Thus, the object 5 will move as pressure is applied and released. However, the characteristics of the compacted insulation material are predictable and thus the final position of the object 5 can be determined accurately and consistently.

In general, we have found that it is desirable to compact the insulation mixture 2 to a density about 10 percent less than the required density of the homogeneous block.

Ultimate compaction of the mixture 2 then occurs when pressure is applied to compact the insulation mixture 6. Much to our surprise, we have found that compaction of the insulation mixture 6 onto the already compacted mixture 2 causes the two charges of mixture to blend at their interface and to form a homogeneous block. It would be expected that the two layers would form separately and at best might be loosely bonded together, but in practice we have found it impossible to detect the interface between the two charges, i.e. the resultant homogeneous block is integral and unitary.

The homogeneous block is then removed from the lower die 1.

By way of example, an electronic component cast into a resin block to provide mechanical protection and having dimensions of 30×20×10 mm may be enclosed within a cylindrical block of microporous thermal insulation material having a diameter of 100 mm and a height of 100 mm, the electronic component being located at the center of the block of microporous thermal insulation material.

Figure 3:
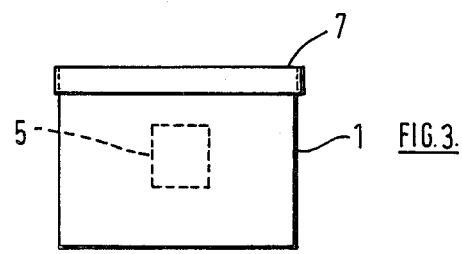
FIG. 3 shows one embodiment of an object enclosed within a block by the method according to the present invention.

The homogeneous block of insulation may be mechanically protected as shown in FIG. 3 if the lower die 1 is not removed from the block. For example, the lower die may be formed as a cup and subsequently may be provided with a lid or cover 7 so that the block is enclosed within a robust skin or container which provides the mechanical protection.

It is possible to combine the steps of forming the recess 4 in the charge of insulation mixture 2 and inserting the object 5 into the recess by mounting the object 5 beneath the die 3 in a temporary manner such that the object 5 remains in the compacted insulation mixture 2.

It should be noted that the recess 4 is not essential for performing the method according to the present invention. Once the insulation mixture 2 has been compacted its characteristics are predicable and thus the final position of the object 5 can be determined merely by locating the object on the compacted insulation mixture 2.

The materials selected for the charges of insulation mixture 2, 6 may be any of those known to provide microporous insulation and typically will include a finely divided microporous power, an infra-red opacifier, a reinforcing fibre and/or other binding additives.

I claim:
1. A method of enclosing an object within a homogeneous block of microporous thermal insulation material, which method comprises the steps of:
   charging a first predetermined amount of loose microporous thermal insulation mixture into a die;
   compacting the insulation mixture into a microporous, thermally insulating block for supporting an object to be insulated;
   locating the object on the microporous block;
   charging a second predetermined amount, sufficient to enclose said object, of loose microporous thermal insulation mixture into the die and about the object; and
   compacting the loose insulation mixture against the microporous block of compacted insulation material so as to form an integral and unitary, microporous, thermally insulating homogeneous block enclosing the object.

2. A method according to claim 1, wherein the first predetermined amount of loose microporous thermal insulation material is compacted into a block having a recess for receiving the object to be insulated.

3. A method according to claim 1, wherein the first predetermined amount of insulation mixture is compacted to a density which is lower than the density of the homogeneous block.

4. A method according to claim 3, wherein the first predetermined amount of insulation mixture is compacted to a density about 10 percent less than the density of the homogeneous block.

5. A method according to claim 1 and including the step of removing the homogeneous block from the die.

6. A method according to claim 1, wherein the homogeneous block is retained within the die in order to provide mechanical protection for the block.

7. A method according to claim 6 and including the step of providing the die with a cover so as to enclose the homogeneous block.

* * * * *